United States Patent
Terry et al.

(10) Patent No.: US 6,967,970 B2
(45) Date of Patent: Nov. 22, 2005

(54) USER EQUIPMENT HAVING IMPROVED POWER SAVINGS DURING FULL AND PARTIAL DTX MODES OF OPERATION

(75) Inventors: Stephen E. Terry, Northport, NY (US); Robert A. DiFazio, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 54 days.

(21) Appl. No.: 10/272,872

(22) Filed: Oct. 17, 2002

(65) Prior Publication Data

US 2003/0086379 A1 May 8, 2003

Related U.S. Application Data

(60) Provisional application No. 60/343,655, filed on Oct. 19, 2001.

(51) Int. Cl.[7] ................................................. H04J 3/00
(52) U.S. Cl. ...................... 370/458; 455/574
(58) Field of Search ............... 370/252, 311, 335–337, 370/342, 347, 441, 442, 458, 479; 455/343.1, 455/343.2, 343.3, 343.4, 574, 343, 522; 340/7.32, 340/539.3, 255.8, 693.3, 7.36, 7.37

(56) References Cited

U.S. PATENT DOCUMENTS

| | | | |
|---|---|---|---|
| 5,371,734 A * | 12/1994 | Fischer | 370/311 |
| 5,559,804 A * | 9/1996 | Amada et al. | 370/347 |
| 6,377,814 B1 * | 4/2002 | Bender | 455/522 |
| 2003/0035394 A1* | 2/2003 | Zeira et al. | 370/335 |
| 2003/0063576 A1* | 4/2003 | DiFazio | 370/280 |

FOREIGN PATENT DOCUMENTS

| | | |
|---|---|---|
| WO | 9836508 | 8/1998 |
| WO | 0070786 | 11/2000 |

* cited by examiner

Primary Examiner—Ricky Ngo
Assistant Examiner—Duc Duong
(74) Attorney, Agent, or Firm—Volpe and Koenig, P.C.

(57) ABSTRACT

The present invention achieves power savings by turning off all or some of the baseband processing for codes and timeslots that have not been transmitted due to full or partial DTX. With respect to partial DTX, the transmitted codes and associated timeslots and radio frames within the shortest TTI in the CCTrCH are determined from the received TFCI. Thereafter, the receiver is turned off for the unused codes as indicated by the received TFCI. With respect to full DTX, following TFCI reception, the receiver is turned off for all timeslots within the shortest TTI.

25 Claims, 5 Drawing Sheets

USER EQUIPMENT HAVING IMPROVED POWER SAVINGS DURING FULL AND PARTIAL DTX MODES OF OPERATION

CROSS REFERENCE TO RELATED APPLICATION(S)

This application claims priority from U.S. provisional application No. 60/343,655 filed on Oct. 19, 2001 which is incorporated by reference as if fully set forth.

FIELD OF THE INVENTION

The present invention relates to the field of wireless communications. Specifically, the present invention relates to providing power savings for high chip rate and low chip rate Time Division Duplex (TDD) type systems during full or partial discontinuous transmission (DTX) modes of operation.

BACKGROUND OF THE INVENTION

With a Third Generation Partnership Project (3GPP) Time Division Duplex (TDD) system, time is partitioned into transmission time intervals (TTIs) that are subdivided into frames, which are further subdivided into timeslots. A TTI is defined as one or more radio frames. Specifically, a radio frame is 10 ms; and a TTI may be 10, 20, 40 or 80 ms. The low chip rate TDD divides each frame into two subframes. The subframes are then divided into timeslots. A Coded Composite Transport Channel (CCTrCH) comprises one or more Transport Channels (TrCHs). A CCTrCH is mapped into a collection of one or more sets of timeslots and codes.

When the maximum data size of a CCTrCH is transmitted, all allocated codes and timeslots are used in the TTI. The actual number of codes and timeslots that are transmitted during a TTI are signaled to the receiver via a Transport Format Combination Index (TFCI). Codes and timeslots are allocated according to a set of rules known to both the transmitter and receiver, so once the number of codes and timeslots are known to the receiver by decoding the TFCI, it also knows which codes were transmitted in each timeslot.

A 3GPP TDD system includes support for discontinuous transmission (DTX) of radio frames when the total bit rate of a CCTrCH is less than the total bit rate of the codes and timeslots allocated to the CCTrCH within a TTI. The coding and multiplexing function in a TDD transmitter maps data onto codes and timeslots.

DTX is applied separately to each CCTrCH. When a CCTrCH is in DTX, some or all of the codes and timeslots allocated to the CCTrCH are not transmitted. DTX falls into two categories referred to as partial DTX and full DTX. During partial DTX, a CCTrCH is active but less than the maximum number of codes and timeslots are filled with data, and some codes and timeslots are not transmitted within the TTI. During full DTX, no data is provided to a CCTrCH by upper protocol layers and there is no data at all to transmit within a TTI.

During non-DTX operation and partial DTX, the first timeslot allocated to a CCTrCH in each frame will contain at least one code to transmit the TFCI. The rules for determining which code contains the TFCI are known to both the transmitter and receiver, so the receiver always knows exactly where to find the TFCI. The CCTrCH may have additional transmitted codes in the same timeslot, additional transmitted codes in subsequent timeslots in the same frame, or additional transmitted codes in subsequent timeslots in subsequent frames of the TTI. The transmitted codes and timeslots may change from one TTI to the next; however, the first timeslot allocated to a CCTrCH in each frame will always contain at least one code to transmit the TFCI. A CCTrCH may comprise multiple TrCHs that have different TTIs. In that case, the transmitted codes may change during each interval equal to the shortest TTI among the TTIs for all TrCHs in the CCTrCH. Throughout this document, references to the TTI will mean the shortest TTI among all the TrCHs in the CCTrCH.

Referring to FIG. 1, an example CCTrCH is shown having codes allocated in timeslots 2, 3, 4, and 5 of a frame and a TTI of 20 ms (that spans two frames). The same codes are allocated to the CCTrCH in both frames of the TTI; however, due to partial DTX they are not all transmitted. In FIG. 1, X indicates allocated codes that are transmitted and Y indicates allocated codes that are not transmitted. In both frames, code 1 in timeslot 2 is transmitted and contains the TFCI. Once the receiver decodes the TFCI in the first frame, it knows which codes and timeslots are transmitted in both frames. It should be noted that since the location of the TFCI is configurable, it could optionally be sent in more timeslots of a particular CCTrCH or within all timeslots of the CCTrCH.

During full DTX, periodic special bursts (SBs) are transmitted and identified by a 0-valued TFCI in the first code of the first timeslot allocated to the CCTrCH. The SB indicates the start of full DTX. Subsequent SBs are transmitted every Special Burst Scheduling Parameter (SBSP) frame. The subsequent SBs provide a mechanism for the receiver to determine that the CCTrCH is still active, and prevent the receiver from declaring out-of-sync. Full DTX ends when upper protocol layers provide data.

SUMMARY OF THE INVENTION

The present invention achieves power savings by turning off all or some of the baseband processing for codes and timeslots that have not been transmitted due to full or partial DTX. With respect to partial DTX, the transmitted codes, timeslots and radio frames within the shortest TTI in the CCTrCH are determined from the received TFCI. Thereafter, the receiver is turned off for the unused timeslots within the shortest TTI in the CCTrCH as indicated by the received TFCI. With respect to full DTX, following TFCI reception, the receiver is turned off for all timeslots within the shortest TTI in the CCTrCH.

DETAILED DESCRIPTION OF THE PREFERRED EMBODIMENTS

Figure 1:
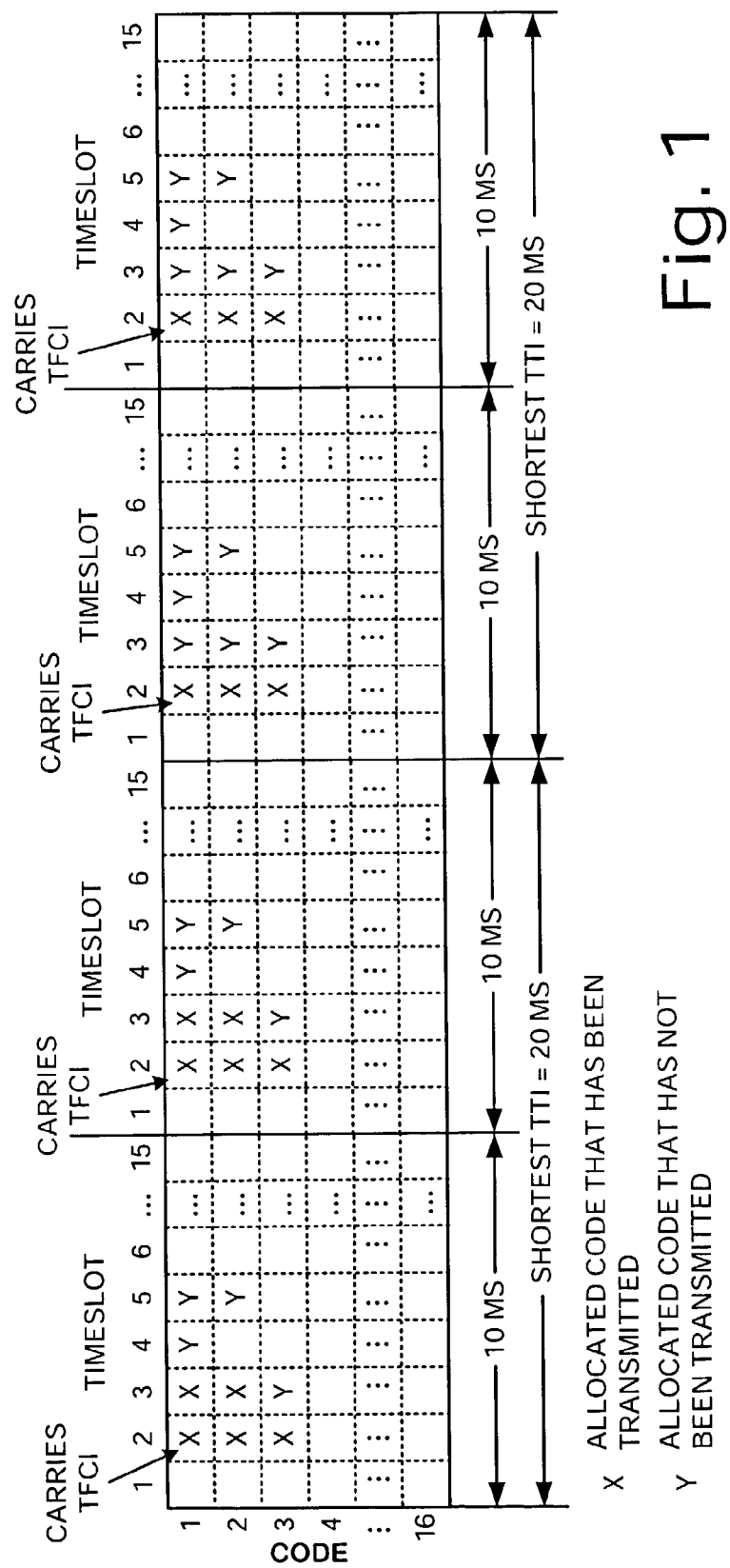
FIG. 1 is a diagram of a coded composite transport channel (CCTrCH).
Figure 2:
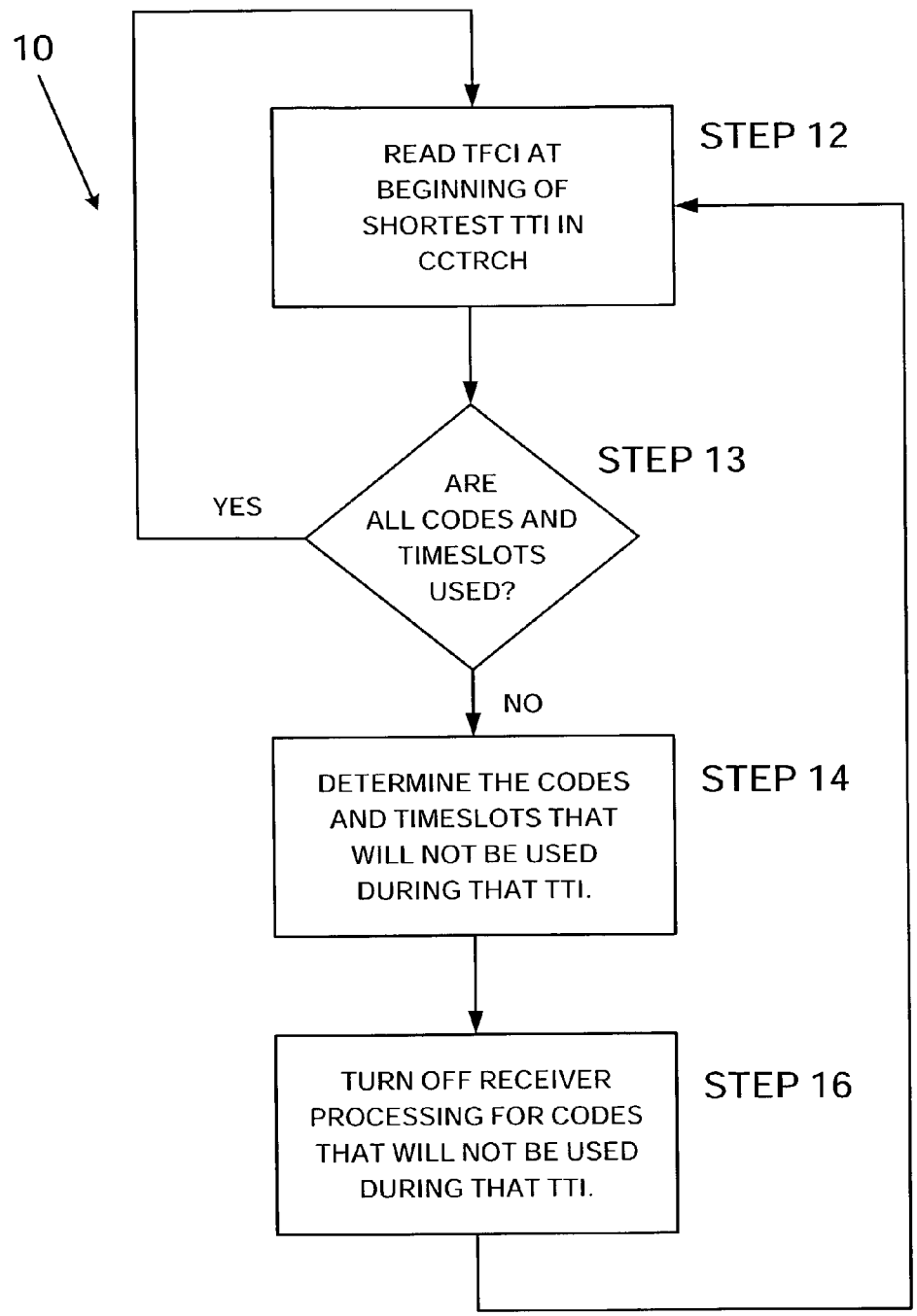
FIG. 2 is a flow diagram of a procedure for power savings during partial DTX.

The present invention will be described with reference to the drawing figures wherein like numerals represent like elements throughout. The present invention is applicable to both full DTX and partial DTX. As will be described in detail hereinafter, with respect to partial DTX, the transmitted codes and radio frames within the shortest TTI in the CCTrCH are determined from the received TFCI. Thereafter, the receiver is turned off for the unused codes and timeslots as indicated by the received TFCI for that TTI. With respect to full DTX, following TFCI reception, the receiver is turned off for all codes and timeslots within the TTI. Referring to FIG. 2, a flow diagram of a procedure 10 for power savings during partial DTX is shown. This procedure 10 will also be explained with reference to the example CCTrCH shown in FIG. 1. The procedure 10 is commenced as the TFCI at the beginning of the shortest TTI among TrCHs in the CCTrCH is read (step 12). In the example shown in FIG. 1, the TFCI would be read in code number 1 of timeslot number 2 in the first and third frames. If a TTI spans multiple frames, the same TFCI is repeated in each frame. Thus in FIG. 1, the TFCIs in the second and fourth frame are repeats of the TFCIs in the first and third frame, respectively. It is then determined (step 13) whether or not all codes and timeslots will be transmitted. If the TFCI indicates all codes, timeslots and frames within the shortest TTI will be transmitted, the receiver is not in either full or partial DTX, and the procedure repeats at the beginning of the next TTI. If the TFCI indicates some but not all of the codes and timeslots will be transmitted within the TTI, the timeslots and frames that will not be transmitted during that TTI are determined (step 14). As is well known by those of skill in the art, the TFCI presents those channels, (i.e. timeslots and codes), which will be transmitted during that TTI. Accordingly, it can be determined which codes and timeslots will be required during that TTI.

The receiver is then turned off for the timeslots and frames that will not be used during that TTI (step 16). Referring to FIG. 1, timeslots 4 and 5 of frames 1 and 2 are not processed and timeslots 3, 4 and 5 of radio frames 3 and 4 are not processed. If the receiver has already received or processed data corresponding to codes and timeslots that have not been transmitted, it may terminate processing of those codes and timeslots, or limit processing to the subset of codes and timeslots that were transmitted. As would be appreciated by those of skill in the art, this procedure 10 has several significant benefits. First, since codes and timeslots that the receiver determines will not be transmitted are not processed, the amount of processing, and the time during which the receiver must be active, is based upon the amount of data that is transmitted. The power savings can be significant if, during partial DTX, there are many codes and timeslots which are not utilized. Secondly, having the ability to turn off the receiver during timeslots which are inactive presents a significant reduction in power requirements. This can significantly increase the battery life of a mobile unit.

It should be noted that a UE may be required to receive more than one CCTrCH at one time. Since DTX of CCTrCHs are controlled independently of each other, certain receiver processes may need to remain on in order to receive data for other CCTrCHs that may share allocated timeslots. In such a case, a receiver would turn off as many processes as possible to maximize the power savings associated with the CCTrCH or CCTrCHs that are in DTX (either partial or full DTX).

Since significant power savings can be achieved during partial DTX, it is logical to assume that further advantages can be gained from implementing the present invention during full DTX.

Figure 3:
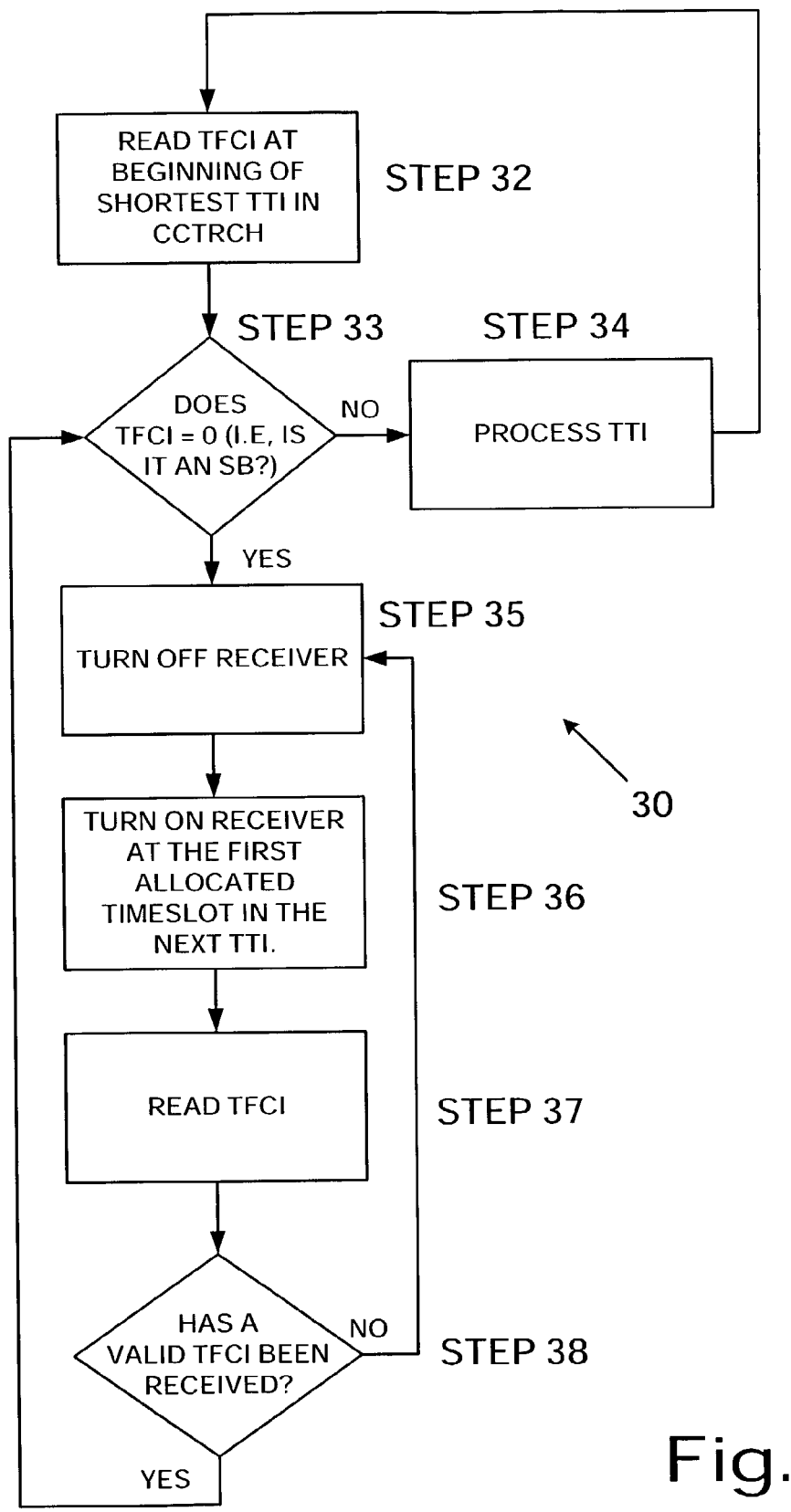
FIG. 3 is a flow diagram of a procedure for power savings during full DTX.

Referring to FIG. 3, a procedure 30 for power reduction during full DTX is shown. At step 32, the procedure 30 is commenced by reading the TFCI at the beginning of the shortest TTI among TrCHs in the CCTrCH. As mentioned previously, a 0-valued TFCI indicates an SB which indicates the start of full DTX. If the TFCI does not indicate an SB (step 33), the TTI is processed (step 34), and the procedure repeats at the beginning of the next TTI. If the TFCI does indicate an SB, then the CCTrCH is in full DTX and the receiver is turned off (step 35). The receiver remains off until the first allocated timeslot in the next TTI at which point it turns on (step 36) and reads the TFCI (step 37). If a valid TFCI is received (step 38), the procedure 30 returns to step 33. If a valid TFCI has not been received then the receiver assumes the CCTrCH is still in full DTX, returns to step 35, and turns off for the remainder of the TTI. A valid TFCI is a TFCI that corresponds to a configured TFC for that CCTrCH or an SB.

Figure 5:
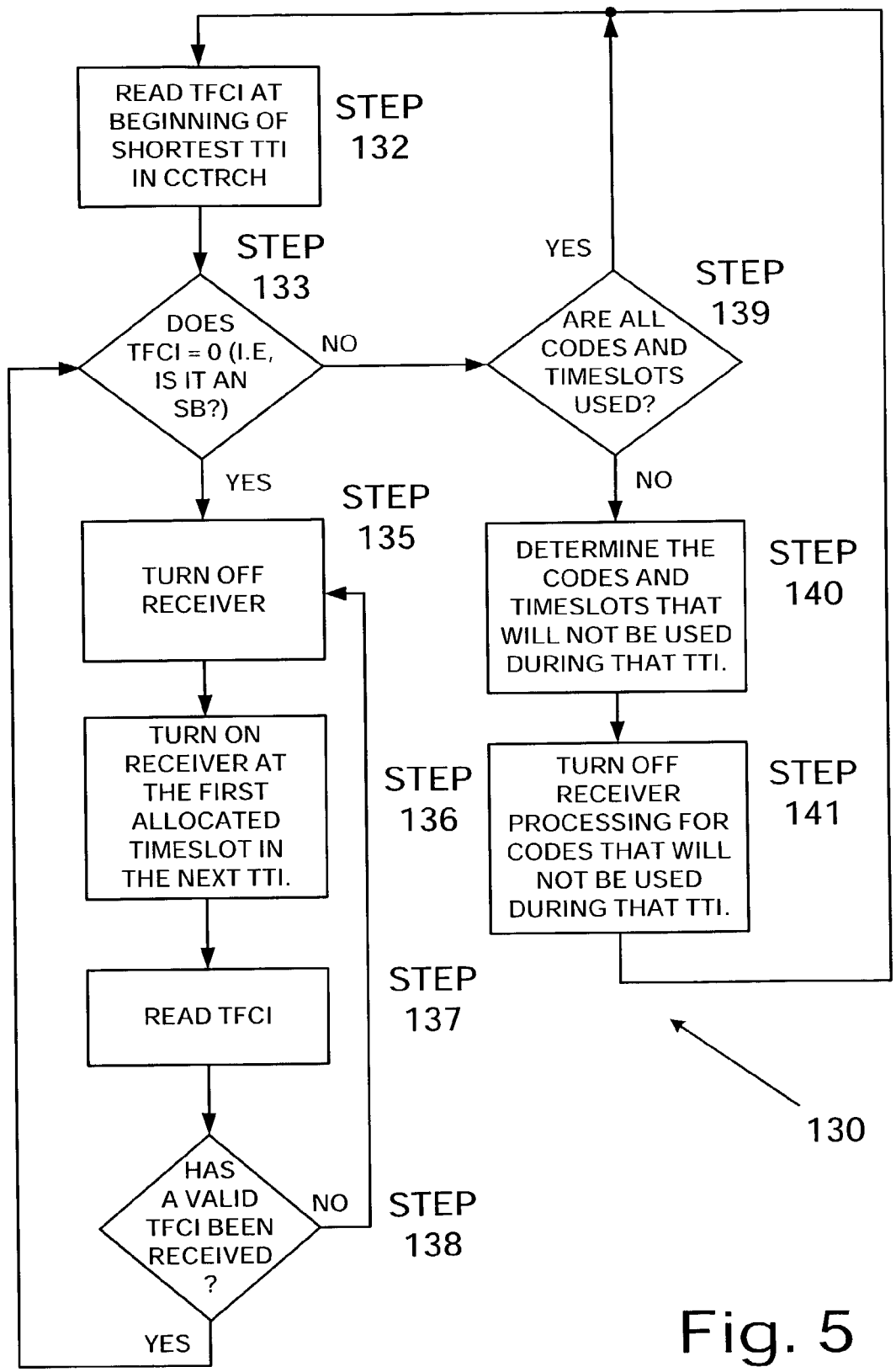
FIG. 5 is a flow diagram of a procedure for power savings during either full or partial DTX.

Referring to FIG. 5, a procedure 130 for power reduction during either partial or full DTX is shown. At step 132, the procedure 130 is commenced by reading the TFCI at the beginning of the shortest TTI among TrCHs in the CCTrCH. If the TFCI does not indicate an SB (step 133), it is then determined (step 139) whether or not all codes and timeslots will be transmitted. If the TFCI indicates all codes, timeslots and frames within the shortest TTI will be transmitted, the receiver is not in either full or partial DTX, and the procedure repeats at the beginning of the next TTI. If the TFCI indicates some but not all of the codes and timeslots will be transmitted within the TTI, the timeslots and frames that will not be transmitted during that TTI are determined (step 140). The receiver is then turned off for the timeslots and frames that will not be used during that TTI (step 141). If the receiver has already received or processed data corresponding to codes and timeslots that have not been transmitted, it may terminate processing of those codes and timeslots or limit processing to the subset of codes and timeslots that were transmitted.

If the TFCI indicates a special burst (step 133), then the CCTrCH is in full DTX and the receiver is turned off (step 135). The receiver remains off until the first allocated timeslot in the next TTI, at which point it turns on (step 136) and reads the TFCI (step 137). If a valid TFCI is received (step 138), the process returns to step 133. If a valid TFCI has not been received then the receiver assumes the CCTrCH is still in full DTX, returns to step 135, and turns off for the remainder of the TTI.

Figure 4:
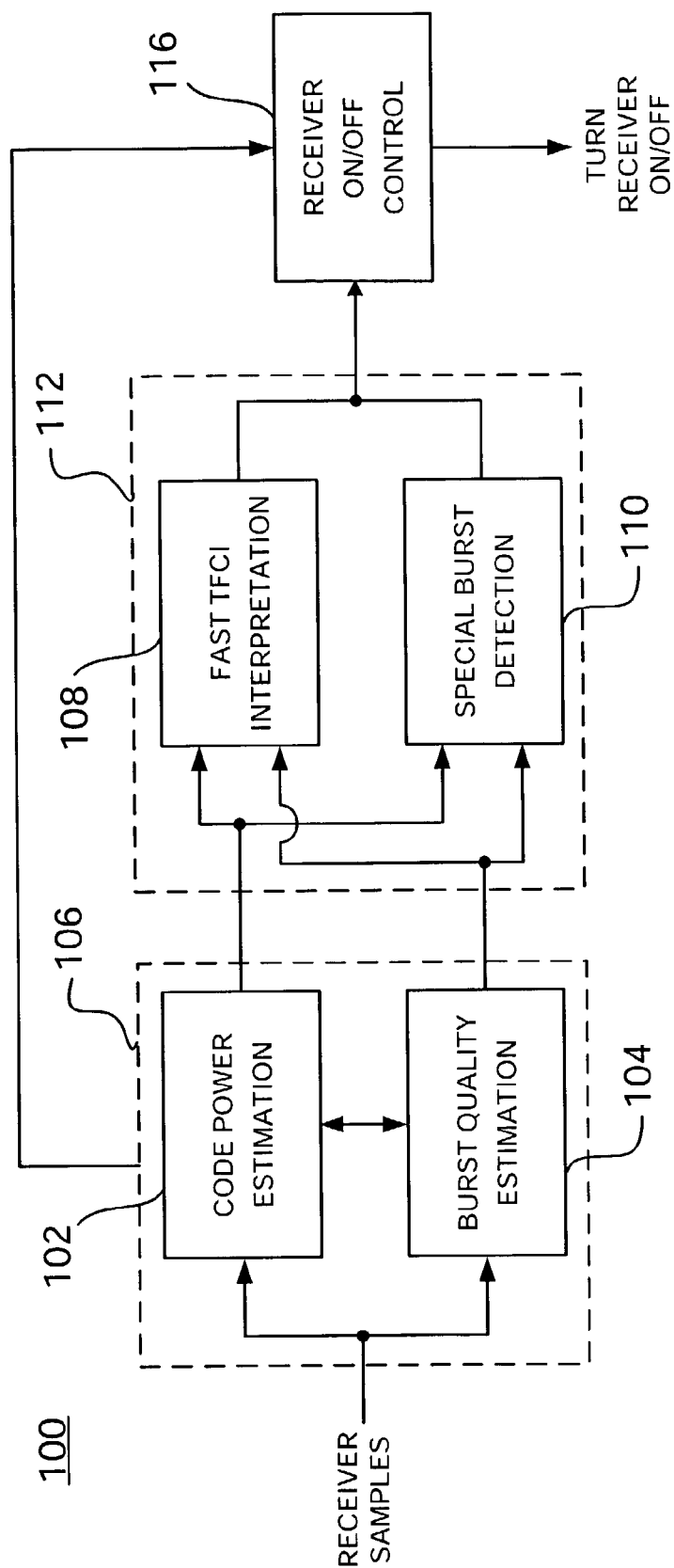
FIG. 4 is a block diagram of a system made in accordance with the present invention.

Referring to FIG. 4, a system 100 in accordance with the present invention is shown. The system 100 includes a code power estimation unit 102, a burst quality estimation unit 104, a fast TFCI interpretation unit 108, a special burst detection unit 110, and a receiver on/off control unit 116. Although the code power estimation unit 102 and the burst quality estimation unit 104 are shown as separate entities, these could easily be combined, as would be appreciated by those of skill in the art, into a single preprocessing unit 106. Likewise, although the fast TFCI interpretation unit 108 and the special burst detection unit 110 are shown as separate entities, they may be combined into a single detection unit 112 which detects and interprets the information within the TFCI fields.

The code power estimation unit 102 estimates the power of each received code. The burst quality estimation unit 104, estimates a quality metric on the received burst, for example, the signal-to-noise ratio. Together, the code power estimation unit 102 and the burst quality estimation unit 104 perform preprocessing of the received signal, which helps the fast TFCI interpretation unit 108 and the special burst detection unit 110 determine whether or not a valid TFCI has been received. Essentially, the code power estimation unit 102 and the burst quality estimation unit 104 provide a first threshold that the received signal must overcome. This helps the system 100 determine a valid burst from other energy that is received by the receiver. This also helps to avoid the erroneous detection of received energy (that is not a valid TFCI) as a valid TFCI. Such an erroneous detection could cause the receiver to turn on unnecessarily and ultimately results in erroneous data, thus increasing the amount of processing required, wasting power, and erroneously increasing the BLER which results in unnecessary increases in transmit power.

The fast TFCI interpretation unit 108 interprets the TFCI bits. An interpretation of TFCI bits identifies the active codes and timeslots (i.e., the one(s) that will be transmitted during the TTI within the CCTrCH) and inactive codes and timeslots in time to activate/deactivate circuitry for the processing of subsequent timeslots in the current radio frame and in subsequent radio frames encompassed by the shortest TTI within the CCTrCH. The inactive timeslots and radio frames are not processed.

The special burst detection unit 110 determines whether or not an SB has been received, thereby signaling the commencement of full DTX. As shown, the output of the fast TFCI interpretation unit 108 and the special burst detection unit 110 are input into the receiver on/off control 116.

The fast TFCI interpretation unit 108 detects the presence of a valid TFCI, and identifies the active codes (both current and subsequent timeslots) to the receiver on/off control 116, which uses this signal to turn the receiver on for the active timeslots and turn the receiver off for the inactive timeslots within that TTI. Likewise, if the special burst detection unit 110 detects the presence of an SB, indicating full DTX has commenced, the receiver on/off control 116 is notified. The receiver on/off control 116 turns the receiver off for all following codes, timeslots and radio frames within the shortest TTI within the CCTrCH.

If the receiver has entered DTX, it will turn on at the next TTI in an attempt to read a TFCI. The code power estimation unit 102 and the burst quality estimation unit 104 provide a threshold that the signal must overcome to declare that a signal was received. If the threshold is exceeded, then the fast TFCI interpretation unit 108 and special burst detection unit 110, determine if the TFCI has a valid value (that is, it either equals zero or equals a value corresponding to a TFC stored in the UE). If the threshold is not exceeded, TFCI does not equal a valid value, or the TFCI equals zero (indicating an SB and continuation of full DTX), then the receiver on/off control 116, is notified to turn the receiver off for all following codes, timeslots and radio frames within the shortest TTI within the CCTrCH. If the threshold is exceeded and the TFCI equals a valid non-zero value, then the fast TFCI interpretation unit 108 identifies the active codes (both current and subsequent timeslots) to the receiver on/off control 116, which uses this signal to turn the receiver on for the active timeslots and turn the receiver off for the inactive timeslots.

The present invention is compatible with the current wideband and narrowband TDD standards and TD-SCDMA. It provides the capability to save UE power during all but the first timeslot of a TTI allocated to a CCTrCH when the CCTrCH is in full DTX. It also provides the capability to save UE power during partial DTX by not processing codes or full timeslots during all but the first timeslot of a TTI allocated to a CCTrCH.

The low chip rate TDD splits the TFCI word between two subframes. This means that both subframes need to be processed before a TFCI word can be decoded. According to the present invention, the power savings would only be achieved during the second subframe and following radio frames within the smallest TTI in a CCTrCH. All allocated codes would need to be processed during the first subframe.

The following aspects of the invention, if implemented, would also provide further power savings for receivers using narrowband TDD or TD-SCDMA signals. For example, putting the full TFCI word in the first subframe and not sending a TFCI in the second subframe allows the receiver to save power by turning off in timeslots in the first as well as second subframe. An alternative that maintains the same physical channel format in both subframes is to leave the TFCI fields in both subframes; however, encode all TFCI bits into the first subframe. This allows the receiver to save power by turning off in timeslots in the first as well as second subframe and the TFCI fields in the second subframe can be designated for future use. As another alternative, the subframe and TFCI placement are left in their current configuration, but the same TFCI word is repeated in both subframes. The receiver can then choose to ignore the repeated TFCI bits in the second subframe and save power by turning off in timeslots in the first as well as second subframe. Finally, an alternative applicable to wideband, narrowband TDD, or TDSCDMA standards is to encode the TFCI in a single field (as opposed to two fields) in each timeslot, preferably before the midamble. The receiver could then process the TFCI before both data fields and turn off sooner, possibly before processing the full timeslot containing the TFCI, and achieving further power savings.

What is claimed is:

1. A method for saving power during discontinuous transmission (DTX) of a time division duplex (TDD) receiver; comprising:
   receiving a transport format combination index (TFCI) for a coded composite transport channel (CCTrCH), the CCTrCH having a plurality of transport channels (TrCHs), each TrCH comprising at least one code and timeslot and having an associated transmission time interval (TTI) comprising at least one radio frame;
   determining from the received TFCI transmitted codes, timeslots and radio frames within the shortest TTI in the CCTrCH;
   turning off receiver processing for codes and timeslots that are not transmitted within said shortest TTI.

2. The method of claim 1 further comprising turning on receiver processing at a first allocated timeslot after said TTI.

3. The method of claim 1 wherein said DTX is partial DTX.

4. The method of claim 1 wherein said DTX is full DTX.

5. A method for saving power during discontinuous transmission (DTX) of a time division duplex (TDD) receiver; comprising:
   receiving a transport format combination index (TFCI) for a coded composite transport channel (CCTrCH), the CCTrCH having a plurality of transport channels (TrCHs);
   determining from the received TFCI, the active TrCHs;
   turning off receiver processing for all inactive TrCHs; and
   turning on receiver processing after a predetermined duration, wherein said predetermined duration is the shortest transmission time interval (TTI) within the CCTrCH.

6. A method for saving power during discontinuous transmission (DTX) of a time division duplex (TDD) receiver; comprising:
   receiving a transport format combination index (TFCI) for a coded composite transport channel (CCTrCH), the CCTrCH having a plurality of codes and timeslots;
   determining from the received TFCI, transmitted codes and timeslots;
   turning off the receiver for all inactive codes and timeslots that are not transmitted.

7. The method of claim 6 wherein said DTX is partial DTX.

8. The method of claim 6 wherein said DTX is full DTX.

9. The method of claim 6 further comprising turning on receiver processing after a predetermined duration.

10. The method of claim 9 wherein said predetermined duration is the shortest transmission time interval (TTI) within the CCTrCH.

11. A method for saving power during discontinuous transmission (DTX) of a time division duplex (TDD) receiver; comprising:
   receiving a transport format combination index (TFCI) for a coded composite transport channel (CCTrCH), the CCTrCH having a plurality of transport channels (TrCHs), each TrCH comprising at least one code and timeslot and having an associated transmission time interval (TTI) comprising at least one radio frame;
   identifying the shortest TTI within the CCTrCH;
   determining from the received TFCI, all codes and timeslots that will not be used during said TTI;
   turning off receiver processing for all codes and timeslots that will not be used during said TTI.

12. The method of claim 11 wherein said DTX is partial DTX.

13. The method of claim 11 wherein said DTX is full DTX.

14. The method of claim 11 further comprising turning on receiver processing after a predetermined duration.

15. The method of claim 11 wherein said predetermined duration is said TTI.

16. A method for saving power during discontinuous transmission (DTX) of a time division duplex (TDD) receiver; comprising:
   receiving a transport format combination index (TFCI) for a coded composite transport channel (CCTrCH), the CCTrCH having a plurality of transport channels (TrCHs), each TrCH comprising at least one code and timeslot and having an associated transmission time interval (TTI) comprising at least one radio frame;
   determining the shortest TTI within the CCTrCH;
   identifying the received TFCI as a special burst; whereby if it is not a special burst, processing returns to the receiving step;
   deactivating receiver processing for all codes and timeslots during said TTI following the receiving of the TFCI;
   activating receiver processing at the first allocated timeslot after said TTI;
   attempting to read a valid TFCI in said timeslot; whereas if a valid TFCI has been received, processing returns to the identifying step, and if a valid TFCI has not been received, processing returns to the deactivating step.

17. A method for saving power during discontinuous transmission (DTX) of a time division duplex (TDD) receiver; comprising:
   receiving a transport format combination index (TFCI) for a coded composite transport channel (CCTrCH), the CCTrCH having a plurality of transport channels (TrCHs), each TrCH comprising a plurality of codes and timeslots;
   determining the shortest transmission time interval (TTI) within the CCTrCH;
   identifying the received TFCI as a special burst; whereby if it is not a special burst, processing returns to the receiving step;
   deactivating receiver processing for all codes and timeslots following the receiving of the TFCI;
   activating receiver processing after a predetermined duration;
   attempting to read a valid TFCI in said timeslot; whereas if a valid TFCI has been received, processing returns to the identifying step, and if a valid TFCI has not been received, processing returns to the deactivating step.

18. The method of claim 17 wherein said predetermined duration is said shortest TTI.

19. A method for saving power during discontinuous transmission (DTX) of a time division duplex (TDD) receiver; comprising:
   receiving a transport format combination index (TFCI) for a coded composite transport channel (CCTrCH), the CCTrCH having a plurality of transport channels (TrCHs);
   determining the shortest transmission time interval (TTI) within the CCTrCH;
   identifying the received TFCI as a special burst; whereby if it is not a special burst, processing returns to the receiving step;
   deactivating receiver processing for all TrCHs in said TTI;
   activating receiver processing at the first allocated timeslot after said TTI;
   attempting to read a valid TFCI in said timeslot; whereas if a valid TFCI has been received, processing returns to the identifying step, and if a valid TFCI has not been received, processing returns to the deactivating step.

20. A method for saving power during discontinuous transmission (DTX) of a time division duplex (TDD) receiver; comprising:
   a) receiving a transport format combination index (TFCI) for a coded composite transport channel (CCTrCH), the CCTrCH having a plurality of transport channels (TrCHs), each TrCH comprising at least one code and timeslot and having an associated transmission time interval (TTI) comprising at least one radio frame;
   b) identifying the shortest TTI within the CCTrCH;
   c) detecting the received TFCI as a special burst, whereas if it is a special burst, proceeding to step f and if it is not a special burst, proceeding to step d;
   d) determining whether all codes and timeslots will be used during said TTI and, if so, returning to step a, whereas, if not, proceeding to step e;
   e) selectively deactivating receiver processing for all codes and timeslots that will not be used during said TTI, and returning to said identifying step;
   f) deactivating receiver processing for all codes and timeslots during said TTI;
   g) activating receiver processing at the first allocated timeslot after said TTI;
   h) attempting to read a valid TFCI in said timeslot; whereas if a valid TFCI has been received, processing returns to step c, and if a valid TFCI has not been received, processing returns to step f.

21. A method for saving power during discontinuous transmission (DTX) of a time division duplex (TDD) receiver; comprising:
- a) receiving a transport format combination index (TFCI) for a coded composite transport channel (CCTrCH), the CCTrCH having a plurality of transport channels (TrCHs), each TrCH comprising a plurality of codes and timeslots;
- b) detecting the received TFCI as a special burst, whereas if it is a special burst, proceeding to step e and if it is not a special burst, proceeding to step c;
- c) determining whether all codes and timeslots will be used and, if so, returning to step a, whereas, if not, proceeding to step d;
- d) selectively deactivating receiver processing, for a first predetermined duration, for all codes and timeslots that will not be used, and returning to step a;
- e) deactivating receiver processing for all codes and timeslots following the receiving of the TFCI;
- f) activating receiver processing after a second predetermined duration;
- g) attempting to read a valid TFCI in said timeslot; whereas if a valid TFCI has been received, processing returns to step b, and if a valid TFCI has not been received, processing returns to step e.

22. The method of claim 21 wherein each TrCH has an associated transmission time interval (TTI), the method further comprising identifying the shortest TTI within the CCTrCH.

23. The method of claim 22 wherein said first predetermined duration is said shortest TTI.

24. The method of claim 22 wherein said second predetermined duration is said shortest TTI.

25. The method of claim 22 wherein both said first and second predetermined durations are said shortest TTI.

* * * * *

UNITED STATES PATENT AND TRADEMARK OFFICE
CERTIFICATE OF CORRECTION

PATENT NO. : 6,967,970 B2 Page 1 of 1
APPLICATION NO. : 10/272872
DATED : November 22, 2005
INVENTOR(S) : Terry et al.

It is certified that error appears in the above-identified patent and that said Letters Patent is hereby corrected as shown below:

ON THE TITLE PAGE

At column 6, line 27, after the word "or", delete "TDSCDMA" and insert therefor --TD-SCDMA--.

Signed and Sealed this

First Day of August, 2006

JON W. DUDAS
*Director of the United States Patent and Trademark Office*